US009729629B2

(12) United States Patent
Crockett et al.

(10) Patent No.: US 9,729,629 B2
(45) Date of Patent: Aug. 8, 2017

(54) OPTIMIZING DATA TRANSFER ACROSS MULTIPLE ASYNCHRONOUS DATA REPLICATION SESSIONS USING SHARED BANDWIDTH

(71) Applicant: International Business Machines Corporation, Armonk, NY (US)

(72) Inventors: Robert N. Crockett, Tucson, AZ (US); Eduard A. Diel, Tucson, AZ (US); Gregory E. McBride, Vail, AZ (US); Alan G. McClure, Sahuarita, AZ (US); David M. Shackelford, Tucson, AZ (US); Nadim P. Shehab, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 14/159,699

(22) Filed: Jan. 21, 2014

(65) Prior Publication Data

US 2015/0207874 A1   Jul. 23, 2015

(51) Int. Cl.
*H04L 29/08* (2006.01)
*G06F 17/30* (2006.01)
(Continued)

(52) U.S. Cl.
CPC .... *H04L 67/1095* (2013.01); *G06F 17/30578* (2013.01); *H04L 41/0896* (2013.01); *H04L 41/147* (2013.01); *H04L 43/04* (2013.01)

(58) Field of Classification Search
CPC ... H04L 67/1085; H04L 43/04; H04L 41/147; H04L 41/0896; H04L 67/1095; G06F 17/30578

See application file for complete search history.

(56) References Cited

U.S. PATENT DOCUMENTS 6,112,236 A * 8/2000 Dollin ................. H04L 12/2602
370/253
6,463,501 B1 * 10/2002 Kern .................... G06F 11/1471
707/999.201

(Continued)

*Primary Examiner* — Robert Beausoliel, Jr.
*Assistant Examiner* — Susan F Rayyan
(74) *Attorney, Agent, or Firm* — John H. Hayes; Brian M. Restauro

(57) ABSTRACT

A computer implemented method includes the steps of establishing a plurality of storage control sessions, wherein each storage control session associates at least one primary storage controller and at least one secondary storage controller with a predetermined path through a data transport network that interconnects the primary and secondary storage controllers; identifying storage control sessions that have data available to be transferred from primary storage controllers to secondary storage controllers; accumulating available data for each session and determining transfer time through the network for each data element to estimate prospective bandwidth utilization; and determining, for a predetermined time interval, whether transferring the available data would fully occupy available bandwidth of the data transport network for the predetermined time interval. When available bandwidth would be fully occupied, the available data accumulated during predetermined time intervals prior to the predetermined time interval in which fully occupied bandwidth was detected is transferred.

20 Claims, 5 Drawing Sheets

(51) Int. Cl.
*H04L 12/26* (2006.01)
*H04L 12/24* (2006.01)

(56) References Cited

U.S. PATENT DOCUMENTS

| | | | |
|---|---|---|---|
| 6,718,361 B1 * | 4/2004 | Basani | H04L 67/1095 707/999.01 |
| 7,181,578 B1 * | 2/2007 | Guha | G06F 3/0607 711/154 |
| 7,330,997 B1 * | 2/2008 | Odom | G06F 11/1464 711/162 |
| 7,539,745 B1 * | 5/2009 | Wang | H04L 12/5695 709/214 |
| 7,647,357 B2 | 1/2010 | Bartfai et al. | |
| 7,734,950 B2 * | 6/2010 | Rogers | G06F 11/2071 711/162 |
| 7,761,431 B2 | 7/2010 | Blea et al. | |
| 2003/0177174 A1 | 9/2003 | Allen et al. | |
| 2004/0205312 A1 * | 10/2004 | Zlotnick | G06F 11/2069 711/162 |
| 2005/0021575 A1 * | 1/2005 | Boyd | G06F 17/30209 |
| 2005/0114857 A1 * | 5/2005 | Chen | G06F 9/524 718/100 |
| 2007/0055712 A1 * | 3/2007 | Wolfgang | G06F 17/30578 |
| 2008/0177963 A1 * | 7/2008 | Rogers | G06F 11/2071 711/162 |
| 2012/0185433 A1 | 7/2012 | Harris, Jr. et al. | |
| 2014/0101326 A1 * | 4/2014 | Stoica | H04L 67/1076 709/228 |
| 2014/0304425 A1 * | 10/2014 | Taneja | H04L 47/12 709/235 |
| 2015/0112933 A1 * | 4/2015 | Satapathy | G06F 17/30575 707/634 |

\* cited by examiner

OPTIMIZING DATA TRANSFER ACROSS MULTIPLE ASYNCHRONOUS DATA REPLICATION SESSIONS USING SHARED BANDWIDTH

FIELD OF THE INVENTION

The present invention relates generally to asynchronous data replication and in particular to optimizing data transfer across multiple sessions.

BACKGROUND OF THE INVENTION

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. Data replication systems generally include a centralized time-of-day (TOD) clock resource to provide accurate and consistent time information across system components such that updates written by different applications to different primary storage devices use consistent TOD values as time stamps. Application systems time stamp these updates when writing updates to volumes in the primary storage. The integrity of data updates is related to ensuring that updates are done at the secondary volumes in the volume pair in the same order as they were done on the primary volume. The time stamp provided by the application program determines the logical sequence of data updates.

One definition of a consistency group is a set of updates which, when applied to the mirror targets (mirror secondaries) move the time stamp of the secondary volumes forward by a small increment, and all the volumes are consistent after that increment of data has been applied. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

SUMMARY

Embodiments of the present invention disclose a computer implemented method, computer program product, and system for sharing bandwidth in an asynchronous data replication system having multiple storage control sessions. In one embodiment, in accordance with the present invention, the computer implemented method includes the steps of establishing a plurality of storage control sessions, wherein each storage control session associates at least one primary storage controller and at least one secondary storage controller with a predetermined path through a data transport network that interconnects the primary and secondary storage controllers; identifying storage control sessions that have data available to be transferred from primary storage controllers to secondary storage controllers; accumulating available data for each session and determining transfer time through the network for each data element to estimate prospective bandwidth utilization; and determining, for a predetermined time interval, whether transferring the available data would fully occupy available bandwidth of the data transport network for the predetermined time interval. When available bandwidth would be fully occupied, the available data accumulated during predetermined time intervals prior to the predetermined time interval in which fully occupied bandwidth was detected is transferred.

DETAILED DESCRIPTION

Figure 1:
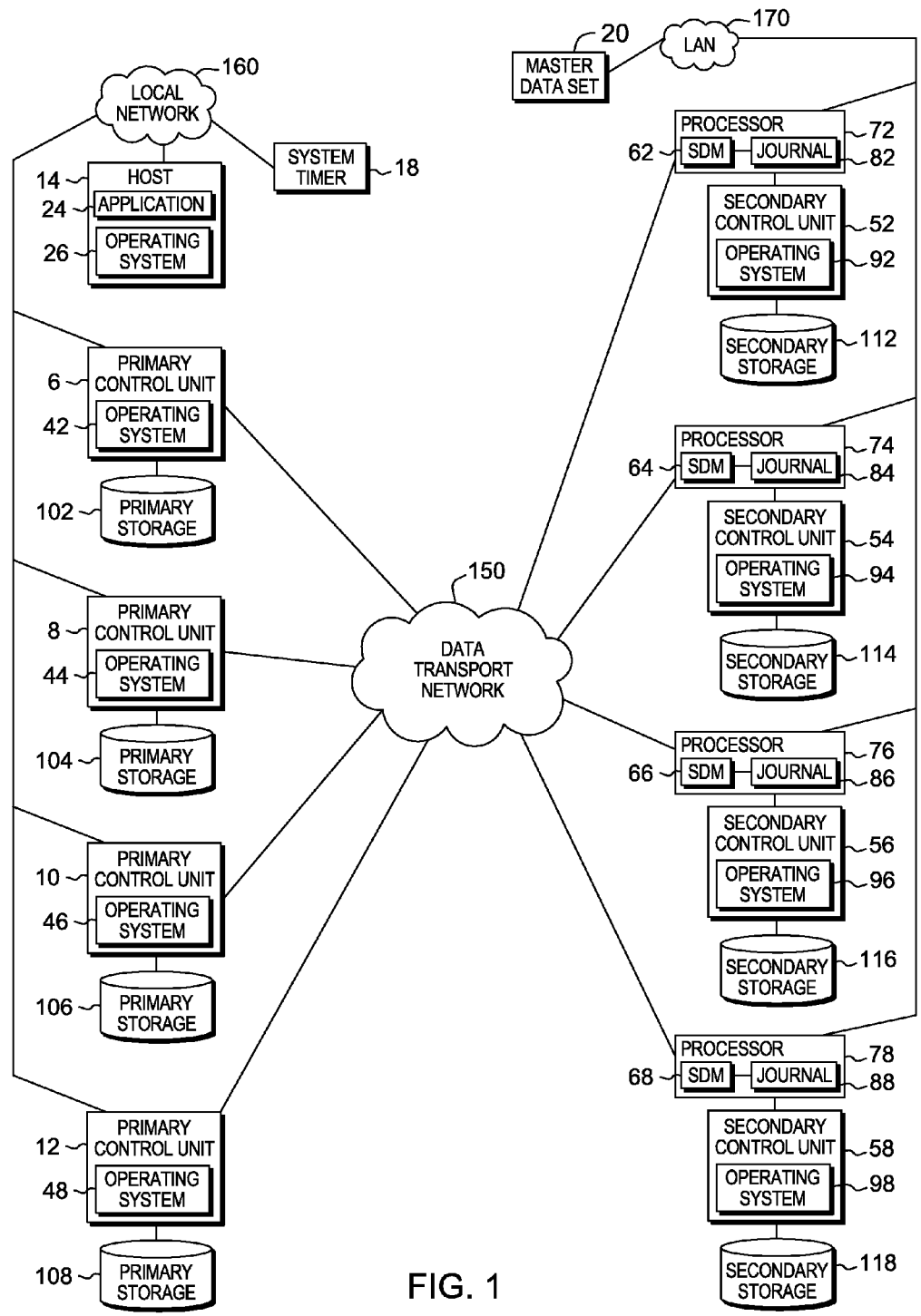
FIG. 1 is a block diagram depicting a primary site host computer system having multiple primary storage volumes, a remote disaster recovery site having multiple secondary storage volumes, and an interconnecting data transport fabric, in accordance with an embodiment of the present invention.

One of the desired results in asynchronous mirror technology is to provide a set of consistent data at the remote site. It should be noted that data elements within updates at the local sites do not have a fixed granularity; any given data element could be as small as a single record or as large as an entire disk track. Updates at the local site may occur at different rates across the granularity of mirroring data transfer. Where bandwidth is shared across multiple mirror data transfer granularities, bandwidth may not be utilized efficiently. One data transfer segment that is not allocated proportionally enough bandwidth may hold back the consistency time of the mirror unnecessarily.

One way to avoid this potential shortcoming is to optimize bandwidth utilization across data transfer segments by transferring the data according to the time it represents. In this way, more bandwidth is devoted to data transfer segments that are furthest behind in consistency time. An embodiment in accordance with the present invention solves the problem of balancing for different storage control sessions' usage of bandwidth. The paths through the data transport network connecting local and remote sites are identified for each session's data, and the paths are examined for common nodes so that shared bandwidth usage can be approximated. The sessions communicate, via a coupling structure, how much data needs to be transferred from each storage control session. Data transfer information is analyzed to determine the percentage of each common network node each session should utilize, to reach the same consistency time in a balanced manner.

Through sharing data among the sessions, the sessions are informed what consistency time they should approach to maximize throughput while attempting to reach the same consistency point. The sessions read according to the bandwidth allocation plan, and update their information about what data will be read next. Using this method, any given session's decision regarding how much data to read at a time is influenced by other session's data transfer needs. The network bandwidth is distributed proportionally to the sessions so that each session can reach equal or similar consistency times with minimal wasted effort.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a block diagram depicting a primary site host computer system 14 having multiple primary storage volumes 102, 104, 106, 108, a remote disaster recovery site having multiple secondary storage volumes 112, 114, 116, 118, and an interconnecting data transport network 150, in accordance with an embodiment of the present invention. FIG. 1 provides only an illustration of one embodiment and does not imply any limitations with regard to the environments in which different embodiments may be implemented.

A plurality of primary control units or storage controllers 6, 8, 10, 12 provide the appropriate interface for the primary storage volumes 102, 104, 106, 108. Data movers 62, 64, 66, 68 manage the copying of updates intended to be written to the primary storage volumes 102, 104, 106, 108, to the secondary control units 52, 54, 56, 58, and to the corresponding secondary storage volumes 112, 114, 116, 118. The data movers 62, 64, 66, 68 are implemented in processors 72, 74, 76, 78, respectively. The data replication environment depicted in FIG. 1 also includes a system timer 18 that is shared among system components. The master data set 20, which will be discussed in detail subsequently, is shared by the system data movers 62, 64, 66, 68.

Communication between the primary control units and system data movers illustrated in FIG. 1 may be implemented strictly over data transport network 150, although all prospective component interconnections with the data transport network 150 are not illustrated in FIG. 1. Communication between the primary site host computer system 14 and the primary control units 6, 8, 10, 12 may be provided through a dedicated local network 160, which may be a bus structure or a high-speed network separate from the data transport network 150. Interconnection with the system timer 18 for components at the primary site may be provided by local network 160, and master data set 20 may be connected with the system data movers 62, 64, 66, 68 through a local area network (LAN) 170, a wide area network, or other suitable data connection arrangement.

In various embodiments, a single processor 72 may host multiple system data mover (SDM) programs 62, although this multiplicity is not illustrated in the Figure for the sake of clarity. Each SDM 62 may manage the transfer of updates for one or more sessions, sometimes referred to as storage control sessions. A session may be broadly defined as a subset of the storage controllers. Since each storage controller may, in fact, be managing more than one storage volume, all of the managed storage volumes may be part of the same session. In the alternative, only some of the storage volumes may be included in a given session, with the remaining storage volumes being part of one or more different sessions. The multiple sessions that may be performing reads in a given system are generally reading from all of their associated storage controllers in parallel and asynchronously, according to how much buffer space each of the sessions has available.

Each session that reads updates from the subset of storage controllers 6, 8, 10, 12 is responsible for determining a consistent point in time and then writing the data out. Consistency groups are formed within a session. All volume pairs assigned to a session will have their updates maintained in the same consistency group. Thus, the sessions act as the instrumentality through which volumes are aggregated into a consistency group. System data mover (SDM) programs 62, 64, 66, 68 read updates from the primary storage controllers 6, 8, 10, 12 and form consistency groups of updates from the primary storage controllers 6, 8, 10, 12 to write to the corresponding secondary storage volumes 112, 114, 116, 118.

Figure 2:
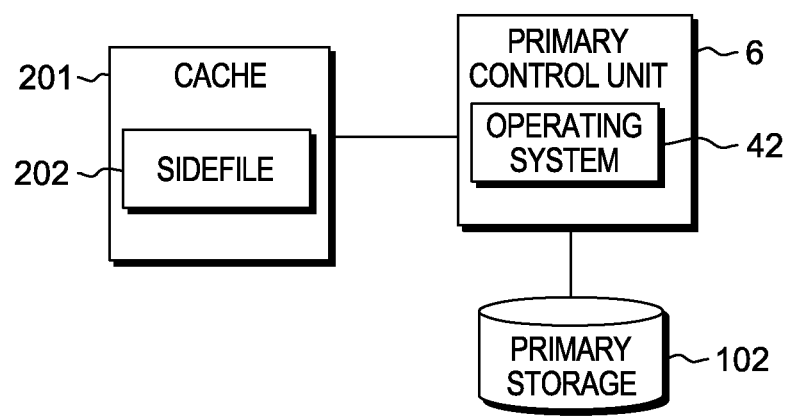
FIG. 2 is a block diagram illustrating a primary control unit of FIG. 1 in greater detail.

FIG. 2 is a block diagram illustrating a primary control unit of FIG. 1 in greater detail. Within a given primary control unit or storage controller, such as storage controller 6, depicted in more detail in FIG. 2, updates may be written to a sidefile 202 in a cache 201 of the primary storage controller. The sidefile 202 is a logical concept that represents the use of the cache 201 of the primary storage controller 6, where a group (e.g., a linked list, etc.) of updates, or record sets, is maintained before being read by SDM reader tasks. These reader tasks, or "reads," are the instrumentalities through which a session transports elements of the record sets from the primary storage controllers, so the updates can be organized into consistency groups and written to secondary storage.

As noted above, a system data mover (SDM) 62 takes the data updates from the sidefile 202 and writes them to a journal 82. Within the journals, the updates are arranged into consistency groups. Consistency groups are formed for all updates to volumes that share a session. The consistency group contains records that have their order of update preserved, even across multiple storage controllers. This preservation of order is important for applications that process dependent write Input/Output (I/Os) operations such as index and data and database and log. The master data set 20 includes, among other things, a list of the sessions being managed, and for each managed session, the time of the most recent update to a volume in such session. The journal data sets for a primary/secondary control unit pair may reside on any device.

Updates read from the sidefiles may then be transferred to journals 82, 84, 86, 88 maintained by the SDMs 62, 64, 66, 68. The journals 82, 84, 86, 88 may be implemented on a disk storage device. Within each of the journals 82, 84, 86, 88, the updates are arranged into consistency groups. The journals 82, 84, 86, 88 may store one or more consistency groups. A consistency group has a consistency time for all data writes in a consistency group having a time stamp equal to or earlier than the consistency time stamp.

A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent. If the system fails while updates from the journal 82, 84, 86, 88 are being applied to a secondary volume, during recovery operations, the updates that did not complete writing to the secondary volume can be recovered from the journal 82, 84, 86, 88 and applied to the secondary volume.

In FIG. 1, the SDMs 62, 64, 66, 68 comprise programs implemented in the processors 72, 74, 76, 78. In an alternative embodiment, the SDMs 72, 74, 76, 78 may be implemented in other systems, such as the primary control units 6, 8, 10, 12, secondary control units 52, 54, 56, 58, etc.

The master data set 20 includes a list of the sessions whose consistency is maintained across sessions. The master data set 20 may be included in a separate memory device that is readily accessible by all sessions. Since each session is effectively managed by an SDM 62, 64, 66, 68, each of the SDMs has access to the master data set 20. The contents of the master data set 20 will be discussed in more detail subsequently in conjunction with the specifics of session operation.

The system timer 18 provides the time stamps for updates to ensure that a common time is used across all SDMs 62, 64, 66, 68 to provide a common time reference for application programs writing updates to volumes, to ensure that updates are not mirrored out-of-sequence. Once updates in the journals 82, 84, 86, 88 are organized within a consistency group, then the updates within a consistency group are applied to the secondary storages 112, 114,116, 118. The creation of consistency groups guarantees that the system will shadow data to a remote site in near real time with update sequence integrity for any type of data. Using consistency groups ensures that updates applied to the secondary storages 112, 114, 116, 118 within a session are consistent as of the consistency time of the consistency group, and consistent between sessions.

If a failure occurs while updates are being written from the journals 82, 84, 86, 88 to secondary storage volumes 112, 114, 116, 118, then, during recovery, the updates that were interrupted during system failure can be recovered from the journals and reapplied to the secondary volumes. In this way, data is ensured consistent within and across sessions during recovery as of a point in time. The copy operations use the master data set 20 to maintain consistency across sessions.

At least a portion of the network interconnecting the system components illustrated in FIG. 1 may comprise a Storage Area Network (SAN), Local Area Network (LAN), Intranet, the Internet, Wide Area Network (WAN), peer-to-peer network, wireless network, arbitrated loop network, etc. The primary storage volumes 102, 104, 106, 108 may comprise an array of storage devices, such as a Just a Bunch of Disks (JBOD), Direct Access Storage Device (DASD), Redundant Array of Independent Disks (RAID) array, virtualization device, tape storage, flash memory, etc. The processors 72, 74, 76, 78 may comprise separate systems having an operating system or comprise one of multiple logical partitions (LPARs) or virtual processors implemented in a single system. The primary control units, or storage controllers 6, 8, 10, 12, and the secondary control units 52, 54, 56, 58 include operating systems 42, 44, 46, 48 and 92, 94, 96, 98, respectively, and mirroring programs to perform the copy operations. The primary site host computer system 14 includes an operating system 26 and one or more applications 24 that communicate 110 requests to the primary control units 6, 8, 10, 12.

Multiple sessions spread across different processors coordinate their updates through the master data set 20 that provides, among other things, the time of the most recent update for every session. Sessions write updated session information to the master data set 20 for other sessions to read in order to maintain data consistency across all sessions. Sessions need to access the master data set 20 to determine the minimum of the most recent update times across all sessions, so that no session applies updates greater than the minimum of the most recent update times. Sessions performing reads and writes to the master data set may lock other sessions out of performing such operations. As the number of sessions increases, the number of reads and writes to the shared master data set 20 increases, and it is possible this may cause delays for the other sessions trying to gain access.

Each session associates primary and secondary volumes such that updates applied to the primary volumes are copied to the associated secondary volumes. The primary and secondary volumes associated in one session may be managed by one or more primary control units or storage controllers 6, 8, 10, 12, and one or more secondary control units 52, 54, 56, 58.

Figure 3:
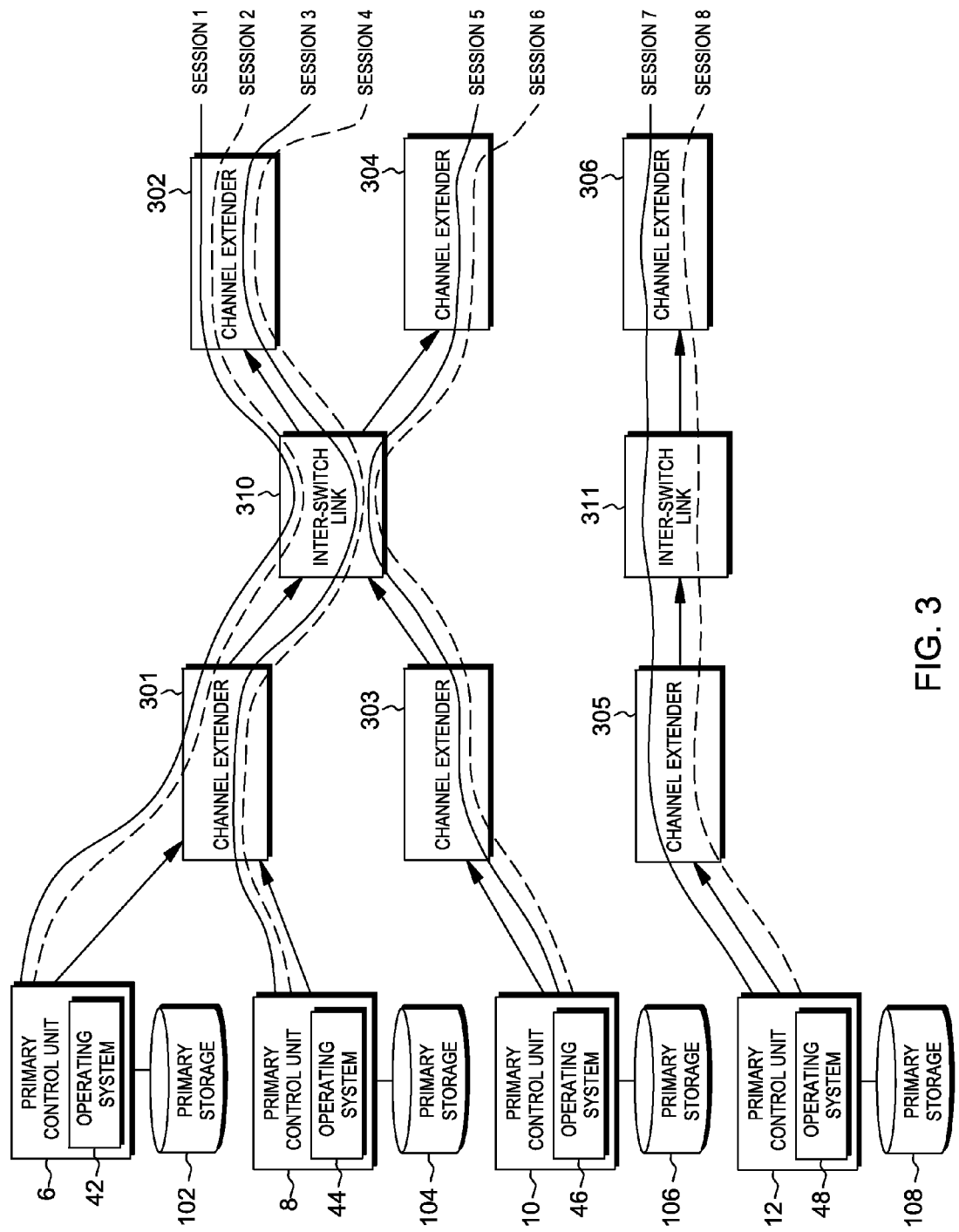
FIG. 3 illustrates a portion of the data transport network of FIG. 1 and its interconnection with primary control units in accordance with an embodiment of the present invention.

FIG. 3 illustrates a portion of the data transport network 150 of FIG. 1 and its interconnection with primary control units 6, 8. 10, 12 in accordance with an embodiment of the present invention. FIG. 3 illustrates one possible arrangement of data transport network 150 elements, as well as one possible configuration of multiple sessions. The principal data transport network 150 that provides connectivity between primary storage controllers 6, 8, 10, 12 and the SDMs 62, 64, 66, 68 that manage data mirroring to the remote site may be a broadband fiber optic network. As such, the data transport network 150 includes channel extenders 301, 303, 305 at the host end to provide an interface between the storage controllers 6, 8, 10, 12 and the fiber network. Channel extenders are provided in pairs, such that channel extenders 302, 304, 306 provide the proper interface from the fiber network to the local network employed at the remote storage location. Interposed between the channel extenders are inter-switch links (ISLs) that perform switching or data routing operations for the fiber network.

FIG. 3 shows how SESSION 1 through SESSION 8 are connected to the storage controllers 6, 8, 10, 12. Storage controllers 6, 8, 10 are connected through the same ISL 310 and their associated sets of channel extender pairs 301, 302 and 303, 304. Channel extender pair 301, 302 handles data from two storage controllers 6, 8, while channel extender pair 303, 304 handles data from only one storage controller 10. Channel extender pair 305, 306, and its intervening ISL 311 essentially provide a single data path for sessions associated with lone storage controller 12.

In an embodiment, an analysis program, in conjunction with bandwidth optimization, determines which nodes of the data transport network are common among the sessions and the data the sessions are mirroring. In this example, SESSIONS 1 through 6 have ISL 310 as a common node. SESSIONS 1 through 4 have channel extender pair 301, 302 in common.

In practice, the sessions may be processing multiple storage controllers 6, 8, 10, 12, the updates from which are competing for the session's resources. But the sessions also have shared bandwidth through the data transport network 150. In prior data replication systems, it was common practice to allow each session to make its own independent decisions on how much data to transfer. The total of all that data transfer could easily exceed the bandwidth of the data transport network 150.

It should be noted that a consistency group may also be characterized as a set of updates, which, when applied to the mirror targets (secondary storage volumes 112, 114, 116, 118) move the time stamp of the secondary volumes forward by a small increment, and all the volumes are consistent after that increment of data has been applied. In an embodiment in accordance with the present invention, the sessions are effectively "coupled" through the shared memory of the master data set 20, to which each of the sessions writes pertinent information. Each session writes its consistency information to the data set, and may then read all of the other sessions' consistency information, to determine the time value to which the mirror will be advanced.

In an example embodiment, this consistency communication method is utilized to share information about how much data will be transferred from the primary storage controllers 6, 8, 10, 12. Each of the sessions tells all of the other sessions how much data it will need to transfer in the future. Utilizing the coupling structure provided through shared memory in the master data set 20, each session is aware of how much data has already been transferred and is ready to apply to the secondary volumes 112, 114, 116, 118. In an embodiment, specific information is shared regarding what data needs to be transferred. Since the sessions share information about how much data currently remains in cache (in the sidefiles 202 in FIG. 2) at the primary storage controllers 6, 8, 10, 12, the sessions acquire a predictive capability regarding how much data will be transferred.

From a data transport network 150 topology viewpoint, there may be multiple channel paths through the network 150 from the primary storage controllers 6, 8, 10, 12 to the secondary volumes 112, 114, 116, 118. At the network interface between the primary storage controllers 6, 8, 10, 12 and the data transport network 150, there may be multiple ports utilized to connect to the data transport network 150, and there may be multiple paths between a remote channel extender (302, for example, in FIG. 3) and the secondary storage volumes 112, 114, 116, 118. In an embodiment, the sessions discover all of the combinations of potential paths through the data transport network 150, and what the common points are. Consequently, a session may consider the most restrictive portion of the path, which is typically a channel extender, and then determine which channel extender is being used to transfer the data for that session's information. Each of the sessions performs similar path analysis and shares the information in the master data set so that all of the sessions may access it. The sessions thus determine what their individual topology is, and then share that information. The sessions may examine the shared topology information and determine which nodes they may have in common with the other sessions.

Since there is extensive information sharing among sessions, the organization for session interoperation may be peer-to-peer. In other words, each time a decision is made regarding how much data to transfer, any one of the sessions has available to it enough information to determine how all of the sessions must behave. The first session that reaches the point where it is time to transfer data will use the topology information and the residual count information (the information about how much data remains in the sidefiles for the storage controllers that the session touches) to determine how far to move time forward (how much the increment will be). The session will accomplish that in a fashion that maximizes data transfer without exceeding network capacity.

Based upon the global nature of data sharing among sessions, each session is able to determine how much data is available to be transferred during a predetermined time interval. In an example embodiment, that predetermined time interval may be 10 milliseconds (ms). The bandwidth optimization algorithm dictates that, for every 10 ms time interval, the algorithm determine how much data is available to be transferred for that 10 ms. The algorithm examines the available data and determines, based upon the accumulated size of the data elements to be transferred, whether the available data uses up the available data transport network 150 bandwidth for that time interval. If it does not, the algorithm moves on to the next 10 ms interval. When the point is reached where the available bandwidth is completely filled by the available data, then that amount of data is transferred by all the sessions. Of course, in practice, prospective network capacity will likely be exceeded during the last time interval tested, so the algorithm will backtrack by one time interval.

Time interval testing permits determination of prospective bandwidth utilization even though data transfer granularity is not a constant. In other words, the granularity of the data elements within a record set of updates stored in a sidefile 202 of a primary storage controller 6 is not uniform. A given application may perform data writes of a single record or a collection of records that may span several sectors of a disk storage volume. For operational considerations, the record sets are managed so that no data element may exceed a disk track in length. So a given data element may be anywhere from a single record in length up to an entire track. Thus, the time required to transfer a given data element to a secondary storage volume may vary widely, and this transfer time cannot be determined without examining the record itself to determine the time each record represents.

So the algorithm operates largely through knowing the history of data transport performance in terms of interconnecting network bandwidth, rather than attempting to predict how the network will perform. The sessions also know which segments of the data transport network are shared with other sessions, so overloading of shared segments is avoided. The data elements with the earliest time stamps are prioritized, because those data elements are most important in moving the application time forward.

In an embodiment, inter-operation of the sessions relies upon extensive data sharing to enable autonomous operation of the sessions in transferring data. Alternatively, however, it is also possible to designate a particular SDM (62 in FIG. 1, for example) as a master and have the other SDMs 64, 66, 68 operate as subordinates, with control passing based upon arbitration by the master. In another alternative embodiment, the role of master could be arranged to rotate among the SDMs depending, at least in part, on the session that requires the most immediate data transfer.

Although the SDMs 62, 64, 66, 68 are not generally able to control the paths through the data transport network 150, these paths are readily discoverable, as are the bandwidth limitations of each path. In any data replication system that communicates with secondary storage volumes 112, 114, 116, 118 that are a relatively long distance away from the primaries 102, 104, 106, 108, the distance itself is a significant factor in how far behind application time the secondary volumes may be. The bandwidth optimization algorithm in accordance with the present invention permits a more intelligent grouping of data for transmission to the secondary site, based, at least in part, upon knowledge of the updates that have occurred since the last consistency group was formed, such that the secondary volumes 112, 114, 116, 118 are maintained as close to application time as possible.

Figure 4:
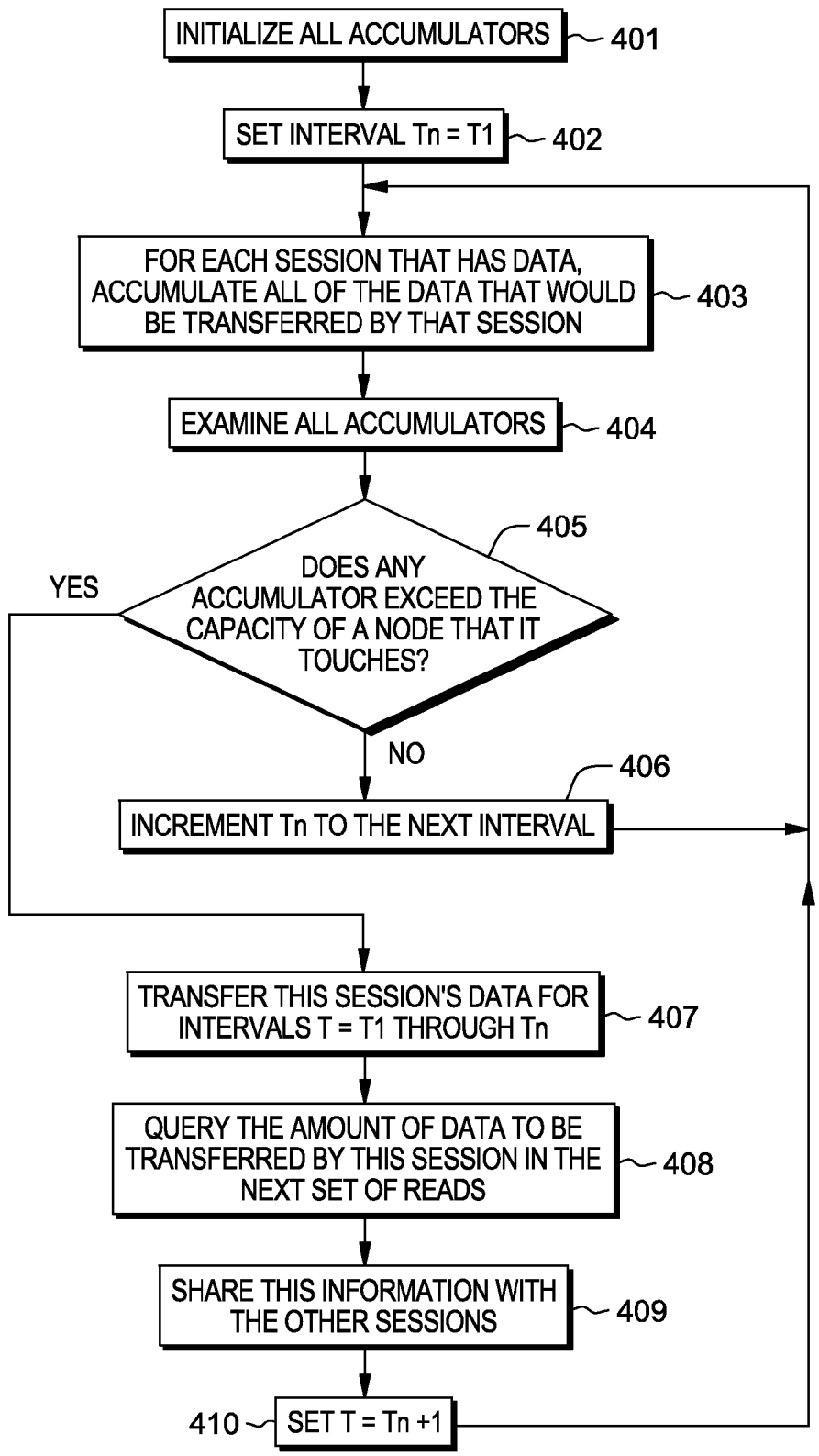
FIG. 4 is a flowchart of a bandwidth optimization algorithm in accordance with an embodiment of the present invention.

FIG. 4 is a flowchart of an optimization algorithm in an embodiment in accordance with the present invention. The optimization program itself may be hosted by any of the processors 72, 74, 76, 78 at the secondary site that host the SDM programs 62, 64, 66, 68. The optimization algorithm determines how much data each session should transfer, based, at least in part, upon each session's knowledge of how much data is consumed by each time interval for all the sessions, which sets of sessions share common network topology, and the capacity of each node. Topological information may be determined at the time the data replication system is installed and configured, and this information is then stored within the master data set 20 for access by all the sessions. In much the same fashion, network capacity through each network node may also be determined during initial system configuration and placed in the shared memory of the master data set 20.

The optimization algorithm optimizes bandwidth utilization across sessions by acting to transfer data according to the time it represents. Effectively, more bandwidth is devoted to the session which is the furthest behind in consistency time. It has been noted that information sharing permits each session to detect the path through the data transport network 150 taken by each session's data (or multiple paths, in the event that multiple storage controllers that may be managed by a single session should happen to use different paths). The various paths are examined for common nodes such that shared bandwidth usage can be approximated.

Each session knows, based upon shared data, how much data needs to be transferred from all of the sessions. This data transfer information is then systematically analyzed to determine the percentage of each common network node each session should utilize to reach the same consistency time in a balanced manner. Since the sessions share all pertinent information, the sessions know what consistency time they should approach to maximize throughput while attempting to reach the same consistency point.

Information about data transport network topology viewed from each session's perspective, as well as knowledge of the data that needs to be transferred by each session, enables, at least in part, the formulation of a bandwidth allocation plan. The sessions read according to the bandwidth allocation plan and update their shared information indicating what data will be read next. Utilizing this method, each session's decision on how much data to read at a time is influenced by other sessions' data transfer requirements. Accordingly, network bandwidth is distributed proportionally to the sessions such that each session can reach substantially equal or similar consistency times in the most efficient fashion.

First, in Step 401, a set of accumulators is initialized. An accumulator is provided for each session. The accumulators are utilized to count (or accumulate) the amount of data that would be transferred by each session into all the nodes touched by that session's path to the data. In the subsequent step (402), a time interval Tn for examination is initialized to time interval T1, representing the next unprocessed interval.

In Step 403, for each session that has data available to transfer during the current interval, the amount of data that would be transferred by that session into all the nodes touched by that session's path to the data is accumulated. Since the size of each element of data is known through examination, the time to transfer each element of data is also known, and is taken into account during the accumulation process based upon available bandwidth for that data element through the data transport network 150.

In the next step (404), all of the accumulators are examined. The algorithm tests (Step 405) to determine whether the amount of data in any accumulator would exceed the capacity of a node that it touches. If NO, the algorithm simply increments Tn to the next interval (Step 406) and continues to examine sessions with data available (Step 403).

If YES, the algorithm transfers this session's data for intervals T1 through Tn (Step 407). In Step 408, the algorithm then queries the amount of data to be transferred by this session in the next set of reads, shares this information with the other sessions (Step 409), increments the time interval for examination to Tn+1 (Step 410), and returns to examination of each session that has data (Step 403).

Figure 5:
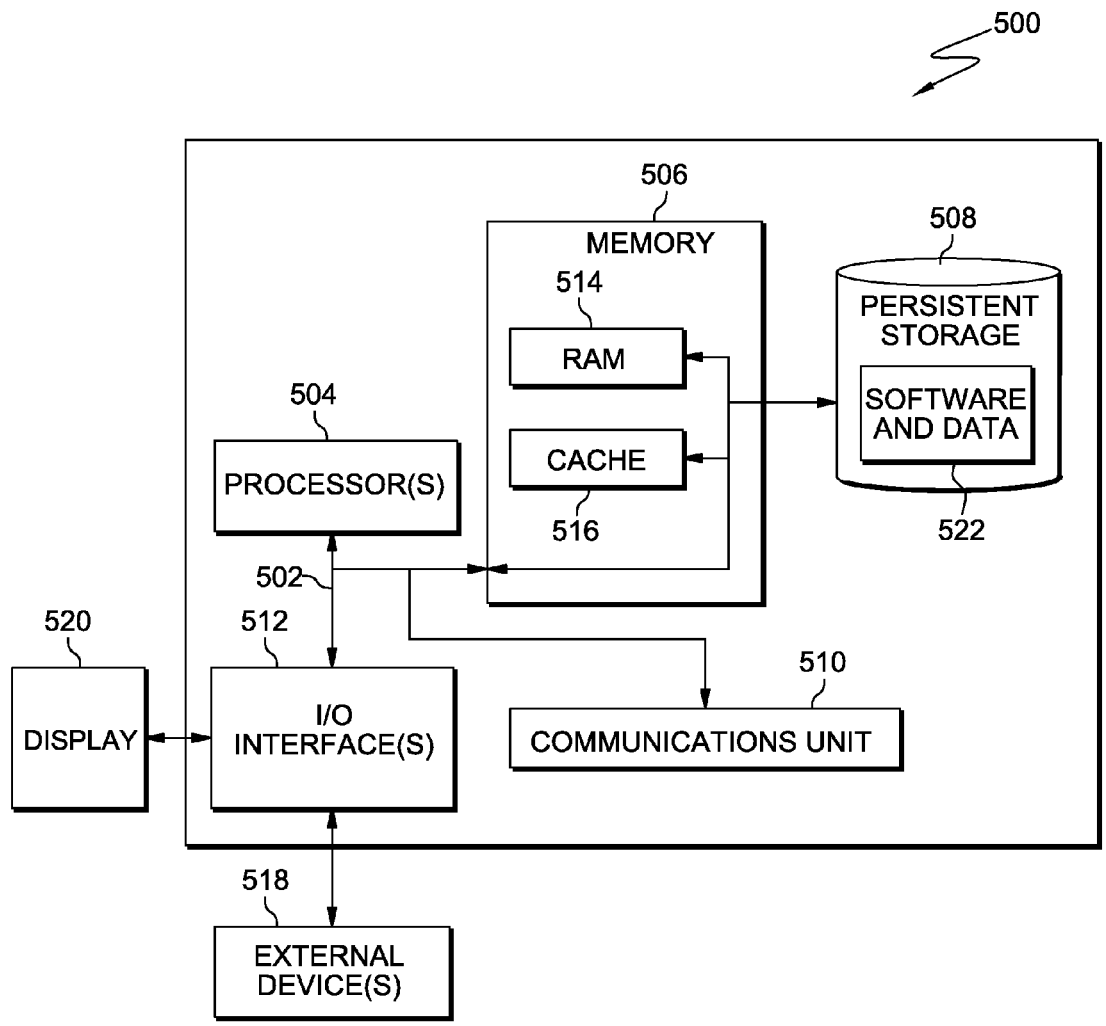
FIG. 5 is a functional block diagram of a computer system in accordance with an embodiment of the present invention.

FIG. 5 is a functional block diagram of a computer system in accordance with an embodiment of the present invention. FIG. 5 depicts computer system 500, which is representative of processor 72 that hosts system data mover application 62 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer-readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. RAM 514 may be used to store journal 82, for example, that is utilized by SDM 62. In general, memory 506 can include any suitable volatile or non-volatile computer-readable storage device. Software and data 522 are stored in persistent storage 508 for access and/or execution by processors 504 via one or more memories of memory 506. With respect to system data mover 62, for example, software and data 522 represents system data mover (SDM) 62 application and any requisite disk workspace. It should be noted that processor or processors 504 may host more than one SDM application.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage devices capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other sub-systems or devices. In an embodiment, communications unit 510 may provide appropriate interfaces to data transport network 150, communications network 170 for access to master data set 20 and system timer 18, and secondary control unit 52 along with associated secondary storage volume 112. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, carried out by one or more processors, for sharing bandwidth in an asynchronous data replication system having multiple storage control sessions, the method comprising the steps of:
    establishing a plurality of storage control sessions, wherein each storage control session associates at least one primary storage controller and at least one secondary storage controller with a predetermined path through a data transport network that interconnects the primary and secondary storage controllers;
    identifying storage control sessions that have data available to be transferred from primary storage controllers to secondary storage controllers;
    sharing available data for each session via a coupling structure;
    determining common nodes each control session should utilize to reach a same transfer time in a balanced manner based on the shared available data, wherein the shared available data for each control session includes a quantity of data that needs to be transferred from respectively associated primary storage controllers to respectively associated secondary storage controllers;
    determining the transfer time through the network for each data element to estimate prospective bandwidth utilization based on the determined common nodes;
    determining, for a predetermined time interval, whether transferring the available data would fully occupy available bandwidth of the data transport network for the predetermined time interval based on the shared data available data for each session; and
    when available bandwidth would be fully occupied, transferring the available data accumulated during predetermined time intervals prior to the predetermined time interval in which fully occupied bandwidth was detected.

2. The method in accordance with claim 1, wherein identifying storage control sessions that have data available to be transferred further comprises the steps of:
    sequentially examining journal memory locations maintained by system data movers controlling the plurality of sessions; and
    when the journal memory locations for a particular session contain one or more records, identifying the particular session as a session having data available to be transferred.

3. The method in accordance with claim 2, wherein contents of the journal memory locations are available through a master data set accessible by all sessions.

4. The method in accordance with claim 1, wherein determining common nodes each control session should utilize to reach a same transfer time in a balanced manner based on the shared available data further comprises the steps of:
    examining each data element available to be transferred for each session and associating a corresponding data element size with each data element;
    analyzing paths through the data transport network associated with each session, including data transport network nodes shared among sessions;
    evaluating available bandwidth for each session, based, at least in part, upon capacity of shared nodes; and
    determining transfer time through the network for each data element based, at least in part, upon data element size and available bandwidth of the session associated with the data element and shared data available data for each session.

5. The method in accordance with claim 4, wherein analyzing paths through the data transport network further comprises the step of retrieving network pathways and bandwidth information from network configuration details stored in shared memory accessible to all the sessions.

6. The method in accordance with claim 4, wherein evaluating available bandwidth further comprises the step of determining capacity of the most restrictive node among nodes in a session's path.

7. The method in accordance with claim 4, further comprising the steps of:
    for each session examined for a particular predetermined time interval, accumulating all of the data that would be transferred by that session in accumulator memory associated with that session;
    examining each accumulator to determine whether the data in any accumulator exceeds the capacity of a node that it touches; and
    if data in any accumulator exceeds the capacity of a node that it touches, transferring the data associated with the session whose accumulator is being examined.

8. The method in accordance with claim 7, further comprising the steps of:
    determining an amount of data to be transferred in a subsequent set of reads by the session whose accumulator is being examined to determine prospective data transfer; and
    sharing information relating to prospective data transfer with all sessions.

9. A computer program product for sharing bandwidth in an asynchronous data replication system having multiple storage control sessions, including one or more computer-readable storage media and program instructions stored on at least one of the one or more storage media, the program instructions comprising:
    program instructions to establish a plurality of storage control sessions, wherein each storage control session associates at least one primary storage controller and at least one secondary storage controller with a predetermined path through a data transport network that interconnects the primary and secondary storage controllers;
    program instructions to identify storage control sessions that have data available to be transferred from primary storage controllers to secondary storage controllers;
    program instructions to share available data for each session via a coupling structure;
    program instructions to determine common nodes each control session should utilize to reach a same transfer time in a balanced manner based on the shared available data, wherein the shared available data for each control session includes a quantity of data that needs to be transferred from respectively associated primary storage controllers to respectively associated secondary storage controllers;

program instructions to determine the transfer time through the network for each data element to estimate prospective bandwidth utilization based on the determined common nodes;

program instructions to determine, for a predetermined time interval, whether transferring the available data would fully occupy available bandwidth of the data transport network for the predetermined time interval based on the shared data available data for each session; and when available bandwidth would be fully occupied, program instructions to transfer the available data accumulated during predetermined time intervals prior to the predetermined time interval in which fully occupied bandwidth was detected.

10. The computer program product in accordance with claim 9, wherein the program instructions stored on the one or more computer readable storage media further comprise:

program instructions to sequentially examine journal memory locations maintained by system data movers controlling the plurality of sessions; and when the journal memory locations for a particular session contain one or more records, program instructions to identify the particular session as a session having data available to be transferred.

11. The computer program product in accordance with claim 10, wherein contents of the journal memory locations are available through a master data set accessible by all sessions.

12. The computer program product in accordance with claim 9, wherein the program instructions to determine common nodes each control session should utilize to reach a same transfer time in a balanced manner based on the shared available data comprise:

program instructions to examine each data element available to be transferred for each session and associating a corresponding data element size with each data element;

program instructions to analyze paths through the data transport network associated with each session, including data transport network nodes shared among sessions;

program instructions to evaluate available bandwidth for each session, based, at least in part, upon capacity of shared nodes; and program instructions to determine transfer time through the network for each data element based, at least in part, upon data element size and available bandwidth of the session associated with the data element and shared data available data for each session.

13. The computer program product in accordance with claim 12, wherein program instructions for analyzing paths through the data transport network further comprise:

program instructions to retrieve network pathways and bandwidth information from network configuration details stored in shared memory accessible to all the sessions.

14. The computer program product in accordance with claim 12, wherein program instructions for evaluating available bandwidth further comprise program instructions program instructions to determine capacity of the most restrictive node among nodes in a session's path.

15. The computer program product in accordance with claim 12, wherein the program instructions stored on the one or more computer readable storage media further comprise:

for each session examined for a particular predetermined time interval, program instructions to accumulate all of the data that would be transferred by that session in accumulator memory associated with that session;

program instructions to examine each accumulator to determine whether the data in any accumulator exceeds the capacity of a node that it touches; and if data in any accumulator exceeds the capacity of a node that it touches, program instructions to transfer the data associated with the session whose accumulator is being examined.

16. The computer program product in accordance with claim 15, wherein the program instructions stored on the one or more computer readable storage media further comprise:

program instructions to determine an amount of data to be transferred in a subsequent set of reads by the session whose accumulator is being examined to determine prospective data transfer; and program instructions to share information relating to prospective data transfer with all sessions.

17. A computer system for sharing bandwidth in an asynchronous data replication system having multiple storage control sessions, the computer system comprising:

one or more computer processors;

one or more computer-readable storage media; and program instructions stored on the computer-readable storage media for execution by at least one of the one or more processors, the program instructions comprising:

program instructions to establish a plurality of storage control sessions, wherein each storage control session associates at least one primary storage controller and at least one secondary storage controller with a predetermined path through a data transport network that interconnects the primary and secondary storage controllers;

program instructions to identify storage control sessions that have data available to be transferred from primary storage controllers to secondary storage controllers;

program instructions to share available data for each session via a coupling structure;

program instructions to determine common nodes each control session should utilize to reach a same transfer time in a balanced manner based on the shared available data, wherein the shared available data for each control session includes a quantity of data that needs to be transferred from respectively associated primary storage controllers to respectively associated secondary storage controllers;

program instructions to determine the transfer time through the network for each data element to estimate prospective bandwidth utilization based on the determined common nodes;

program instructions to determine, for a predetermined time interval, whether transferring the available data would fully occupy available bandwidth of the data transport network for the predetermined time interval based on the shared data available data for each session; and program instructions to transfer, when available bandwidth would be fully occupied, the available data accumulated during predetermined time intervals prior to the predetermined time interval in which fully occupied bandwidth was detected.

18. The computer system of claim 17, wherein the program instructions to identify storage control sessions that have data available to be transferred further comprise program instructions to:
  sequentially examine journal memory locations maintained by system data movers controlling the plurality of sessions; and
  when the journal memory locations for a particular session contain one or more records, identify the particular session as a session having data available to be transferred.

19. The computer system of claim 18, wherein contents of the journal memory locations are available through a master data set accessible by all sessions.

20. The computer system of claim 17, wherein the program instructions to determine common nodes each control session should utilize to reach a same transfer time in a balanced manner based on the shared available data comprise:

program instructions to examine each data element available to be transferred for each session and associate a corresponding data element size with each data element;

program instructions to analyze paths through the data transport network associated with each session, including data transport network nodes shared among sessions;

program instructions to evaluate available bandwidth for each session, based, at least in part, upon capacity of shared nodes; and program instructions to determine transfer time through the network for each data element based, at least in part, upon data element size and available bandwidth of the session associated with the data element and shared data available data for each session.

* * * * *